US008799153B2

(12) United States Patent
White et al.

(10) Patent No.: US 8,799,153 B2
(45) Date of Patent: Aug. 5, 2014

(54) SYSTEMS AND METHODS FOR APPENDING SUPPLEMENTAL PAYMENT DATA TO A TRANSACTION MESSAGE

(75) Inventors: Brigette White, Cortlandt Manor, NY (US); Michael Ameiss, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/113,820

(22) Filed: May 23, 2011

(65) Prior Publication Data

US 2011/0295745 A1    Dec. 1, 2011

Related U.S. Application Data

(63) Continuation-in-part of application No. 11/560,212, filed on Nov. 15, 2006, which is a continuation-in-part of application No. 10/914,766, filed on Aug. 9, 2004, which is a continuation of application No. 09/842,522, filed on Apr. 25, 2001, which is a continuation of application No. 09/144,287, filed on Aug. 31, 1998, now Pat. No. 6,315,193, application No. 13/113,820, which is a continuation-in-part of application No. 10/757,317, filed on Jan. 14, 2004.

(60) Provisional application No. 60/439,899, filed on Jan. 14, 2003, provisional application No. 61/347,821, filed on May 25, 2010.

(51) Int. Cl.
    *G06Q 40/00* (2012.01)
(52) U.S. Cl.
    USPC .............................. 705/39; 705/44; 235/380
(58) Field of Classification Search
    USPC ............... 705/35, 38, 39, 40, 44; 235/380
    See application file for complete search history.

(56) References Cited

U.S. PATENT DOCUMENTS

| 4,346,442 A | 8/1982 | Musmanno |
| 4,376,978 A | 3/1983 | Musmanno |
| 4,597,046 A | 6/1986 | Musmanno et al. |
| 4,774,663 A | 9/1988 | Musmanno et al. |
| 5,012,077 A | 4/1991 | Takano |
| 5,878,405 A | 3/1999 | Grant et al. |
| 5,937,396 A | 8/1999 | Konya |
| 6,016,482 A | 1/2000 | Molinari et al. |
| 6,064,987 A | 5/2000 | Walker et al. |

(Continued)

OTHER PUBLICATIONS

International Search Report and Written Opinion for PCT/US11/37595, dated Sep. 8, 2011.

(Continued)

*Primary Examiner* — Kelly Campen
(74) *Attorney, Agent, or Firm* — Baker Botts L.L.P.

(57) ABSTRACT

A managing platform for appending supplemental payment data to a transaction message receives a transaction message representative of a credit card transaction from a merchant or an associated financial institution. The managing platform uses the transaction data contained in the transaction message and other information to determine whether the transaction satisfies one or more payment rules previously established by the cardholder. If the transaction satisfies a payment rule, the managing platform appends supplemental payment data to the transaction message in a format specified by a financial institution associated with the cardholder. The supplemental payment data includes information identifying a secondary payment account associated with the satisfied payment rule. The managing platform subsequently transmits the appended transaction message to the financial institution associated with the cardholder.

24 Claims, 8 Drawing Sheets

(56) References Cited

U.S. PATENT DOCUMENTS

| | | |
|---|---|---|
| 6,304,860 B1 | 10/2001 | Martin et al. |
| 6,315,193 B1 * | 11/2001 | Hogan ................... 235/379 |
| 6,336,104 B1 | 1/2002 | Walker et al. |
| 6,343,279 B1 | 1/2002 | Bissonette et al. |
| 6,353,811 B1 | 3/2002 | Weissman |
| 6,484,153 B1 | 11/2002 | Walker et al. |
| 6,786,400 B1 | 9/2004 | Bucci |
| 6,793,131 B2 * | 9/2004 | Hogan ................... 235/379 |
| 6,834,269 B1 | 12/2004 | Bueche |
| 7,104,443 B1 | 9/2006 | Paul et al. |
| 7,319,986 B2 | 1/2008 | Praisner et al. |
| 7,403,922 B1 | 7/2008 | Lewis et al. |
| 7,567,934 B2 | 7/2009 | Flitcroft et al. |
| 7,676,425 B1 | 3/2010 | Noles |
| 8,126,793 B2 * | 2/2012 | Jones ....................... 705/35 |
| RE43,246 E * | 3/2012 | Bent et al. .............. 705/36 R |
| 8,162,125 B1 * | 4/2012 | Csulits et al. ............ 194/206 |
| 8,225,995 B1 * | 7/2012 | Gangi ..................... 235/381 |
| 2002/0062281 A1 | 5/2002 | Singhal |
| 2002/0083011 A1 | 6/2002 | Kobayashi |
| 2003/0041018 A1 | 2/2003 | DeSane |
| 2003/0055783 A1 | 3/2003 | Cataline et al. |
| 2003/0061157 A1 | 3/2003 | Hirka et al. |
| 2003/0200107 A1 | 10/2003 | Allen et al. |
| 2003/0208438 A1 | 11/2003 | Rothman |
| 2003/0208439 A1 | 11/2003 | Rast |
| 2003/0236704 A1 * | 12/2003 | Antonucci .................. 705/14 |
| 2004/0122769 A1 | 6/2004 | Bailo et al. |
| 2004/0167852 A1 * | 8/2004 | Cutler et al. ............... 705/39 |
| 2004/0215560 A1 | 10/2004 | Amalraj et al. |
| 2005/0049964 A1 * | 3/2005 | Winterer et al. .......... 705/39 |
| 2005/0096986 A1 * | 5/2005 | Taylor et al. .............. 705/16 |
| 2005/0192895 A1 | 9/2005 | Rogers et al. |
| 2005/0209962 A1 * | 9/2005 | Hogan ...................... 705/39 |
| 2006/0206425 A1 | 9/2006 | Sharma |
| 2006/0235775 A1 | 10/2006 | Pollin |
| 2007/0027803 A1 | 2/2007 | Brandes et al. |
| 2007/0038564 A1 | 2/2007 | Leavitt et al. |
| 2007/0045407 A1 | 3/2007 | Paul et al. |
| 2007/0250442 A1 * | 10/2007 | Hogan et al. .............. 705/41 |
| 2009/0043702 A1 | 2/2009 | Bennett |
| 2009/0164354 A1 | 6/2009 | Ledbetter et al. |
| 2010/0094735 A1 * | 4/2010 | Reynolds et al. .......... 705/34 |

OTHER PUBLICATIONS

First Data, Transaction Level Processing (TLP) Slideshow Presentation and related materials, undated, 23 pages, no date.

Lucy Lazarzony, "How to Avoid Credit Card Late Fees", Aug. 21, 2002, pp. 1-4.

Gilgoff, Henry. "When Your Checks Bounce: 'Protection' Options, Costs." Newsday, Aug. 15, 2004, p. E.02.

"Solution for optimising payments processing. (IT News)." Database and Network Journal 35.5 (2005): 20. General OneFile. Web. Mar. 12, 2010.

U.S. Appl. No. 13/437,323, Nov. 2, 2012 Amendment and Request for Continued Examination (RCE).

U.S. Appl. No. 10/914,766, Jun. 6, 2013 Notice of Allowance.

* cited by examiner

| Name | Criteria | Secondary Account | Priority |
|---|---|---|---|
| OVER50 | Transaction Amount>$250 | Account A | 1 |
| GROCERY | Merchant Type = Grocery Store | Account B | 2 |
| NEARBALANCE | Remaining Balance of Credit Line < $500 | Account B | 3 |
| OVER100ANDPHARMACY | Transaction Amount > $100 and Merchant Type = Pharmacy | Account C | 4 |
| LESS50STOREA2WEEKS | Transaction Amount < $50 and Merchant ID = Store A and Amount Charged to Credit Line over Last Week > $2000 | Account A | 5 |
| LESS10 | Transaction Amount < $10 | Account C | 6 |

FIG. 5

SYSTEMS AND METHODS FOR APPENDING SUPPLEMENTAL PAYMENT DATA TO A TRANSACTION MESSAGE

CROSS REFERENCE TO RELATED APPLICATIONS

Related Applications

This application claims priority to U.S. Provisional Patent Application Ser. No. 61/347,821 filed May 21, 2010, which is incorporated herein by reference. This application is a continuation-in-part of U.S. patent application Ser. No. 11/560, 212, filed Nov. 15, 2006 and entitled "Financial Transaction Card With Installment Loan Feature," which is a continuation-in-part of U.S. application Ser. No. 10/914,766, filed on Aug. 9, 2004, which is a continuation of U.S. application Ser. No. 09/842,522, filed on Apr. 25, 2001, which is a continuation of U.S. application Ser. No. 09/144,287, filed on Aug. 31, 1998, now U.S. Pat. No. 6,315,193, entitled "Financial transaction card with installment loan feature," each of which is incorporated by reference herein in their entireties. This application is a continuation-in-part of U.S. patent application Ser. No. 10/757,317, filed on Jan. 14, 2004, entitled "Financial Transaction Card With Automatic Payment Feature," which claims priority to U.S. Provisional Application No. 60/439,899, filed on Jan. 14, 2003, each of which are each incorporated by reference herein in their entireties.

TECHNICAL FIELD OF THE INVENTION

The present invention relates generally to the field of payment card transactions and, in particular, methods and systems for using a flex service provider to process transactions that are to be funded using a secondary payment account.

BACKGROUND OF THE INVENTION

Traditional credit cards are associated with various benefits for the cardholder based on the cardholder's usage of the credit card. For example, credit card account holders may receive loyalty points or cash-back in an amount proportional to the total amount of transactions completed using the credit card. Other benefits may include insurance on the transaction, fraud protection, and other security benefits from using a credit card account. Some of those benefits are typically not available when using debit cards or pre-paid cards to perform transactions.

Credit cards today may also be associated with significant drawbacks for some consumers. Some cardholders have limited available credit, either because they are adjudged to represent a high credit risk, or because past purchases have not yet been paid down and thus consume most or all of the credit line. Additionally, some credit card users may exceed their intended budgets and incur more debt than they would prefer. These considerations have led some consumers to prefer to fund their purchases with non-credit payment cards, even though they must forego the benefits of credit card use.

Therefore, it would be advantageous to permit a cardholder to use a credit card for a substantial number of their payment transactions, and thereby accrue the benefits of using the card, such as loyalty points or cash back, while also permitting the cardholder to pay down their credit purchases from one or more non-credit accounts, to reduce the total outstanding purchases on their credit card line of credit and to provide better control over spending and debt.

SUMMARY OF THE INVENTION

Some embodiments of the present invention include a method for using a secondary account to fund a credit card transaction conducted between a cardholder and a merchant, the method comprising associating a secondary account with a credit card account, the credit card account maintained at a first financial institution, defining one or more payment rules associated with the secondary account, receiving, from a second financial institution, a transaction message associated with a credit card transaction using the credit card account, the transaction message comprising transaction data, determining whether the transaction data satisfies at least one of the one or more payment rules, appending, after the receiving, using a data formatting unit supplemental payment data to the transaction message to form an appended transaction message where the transaction data satisfies at least one of the one or more payment rules, the supplemental data indicating that the credit card transaction is to be funded using the secondary account, and transmitting the appended transaction message to a first financial institution.

In one embodiment, the payment rules may be based on, among other things, a transaction amount, POS geography, a merchant code, a merchant identity, a date of transaction, a total spending amount over a pre-determined time period, or a credit line balance.

The supplemental payment data may include, among other things, a secondary account identifier, a secondary account type identifier, a routing number, an account number, or a name associated with a satisfied payment rule.

In some embodiments, the present invention further comprises periodically scanning messages to identify at least one clearing message that includes supplemental payment data, generating a transfer file, the transfer file including information to effect a transfer from a secondary account associated with the at least one clearing message to a credit card account associated with the at least one clearing message, and transmitting the transfer file to the first financial institution for initiation of a secondary payment process.

In another embodiment, present invention includes a system for identifying a secondary account to fund a credit card transaction conducted between a cardholder and a merchant, the system comprising a user interface for receiving a secondary account identifier and at least one payment rule associated with the secondary account from the cardholder, a storage device for associating the secondary account with a credit card account associated with the cardholder and defining one or more payment rules associated with the secondary account, the credit card account maintained at a first financial institution, a receiver for receiving a transaction message associated with a credit card transaction, said transaction message comprising transaction data, a determination unit for determining whether the transaction data satisfies at least one of the one or more payment rules, a data formatting unit for appending supplemental payment data to the transaction message to form the appended transaction message where the transaction data satisfies at least one of the one or more payment rules, the supplemental payment data indicating that the credit card transaction is to be funded using the secondary account, and a transmitter for transmitting an appended transaction message to the first financial institution.

In some embodiments, the present invention further includes a scanner for periodically scanning clearing messages to identify at least one clearing message that includes the supplemental payment data and a transfer file generator for generating a transfer file, the transfer file including information to effect a transfer from a secondary account associated with the at least one clearing message to a credit card account associated with the at least one clearing message, and wherein the transmitter is further configured to transmit the transfer file to the first financial institution for initiation of a secondary payment process.

BRIEF DESCRIPTION OF THE DRAWINGS

FIG. 5 shows an exemplary embodiment of payment rules that could be defined in connection with the disclosed subject matter.

DETAILED DESCRIPTION

Figure 1:
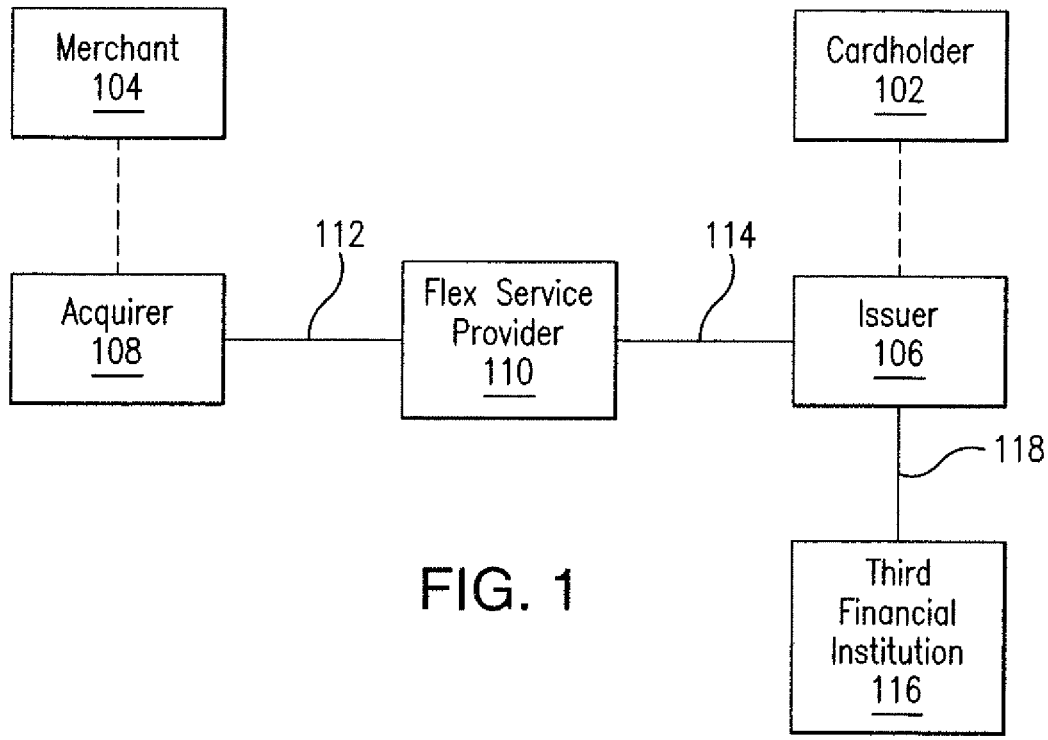
FIG. 1 shows an exemplary embodiment of the system of the disclosed subject matter.

FIG. 1 shows an exemplary embodiment of a system in accordance with the disclosed subject matter, which generally relates to systems and methods for processing transactions between a cardholder 102 and a merchant 104.

The cardholder 102 may maintain a credit card account at a first financial institution such as an issuer 106. The issuer 106 is a financial institution that has provided a credit card or other payment token having any form factor capable of conducting a financial transaction and an associated line of credit to the cardholder 102. The merchant 104 may similarly be associated with a second financial institution such as an acquirer 108. The acquirer 108 is a financial institution where the merchant 104 maintains a financial account.

The systems and methods of the disclosed subject matter also include a flex service provider 110. The functionality of the flex service provider 110 may be performed by a payment processor, a payment network, or a third party. For example, the flex service provider 110 functionality may be performed by a payment network, such as MasterCard. In one embodiment, the issuer 106 and the acquirer 108 may be communicably connected through a flex service provider 110 and communication links 112 and 114. Communication links 112 and 114 may be any communication network. For example, communication links 112 and 114 may be the Internet or a virtual private network.

Figure 2:
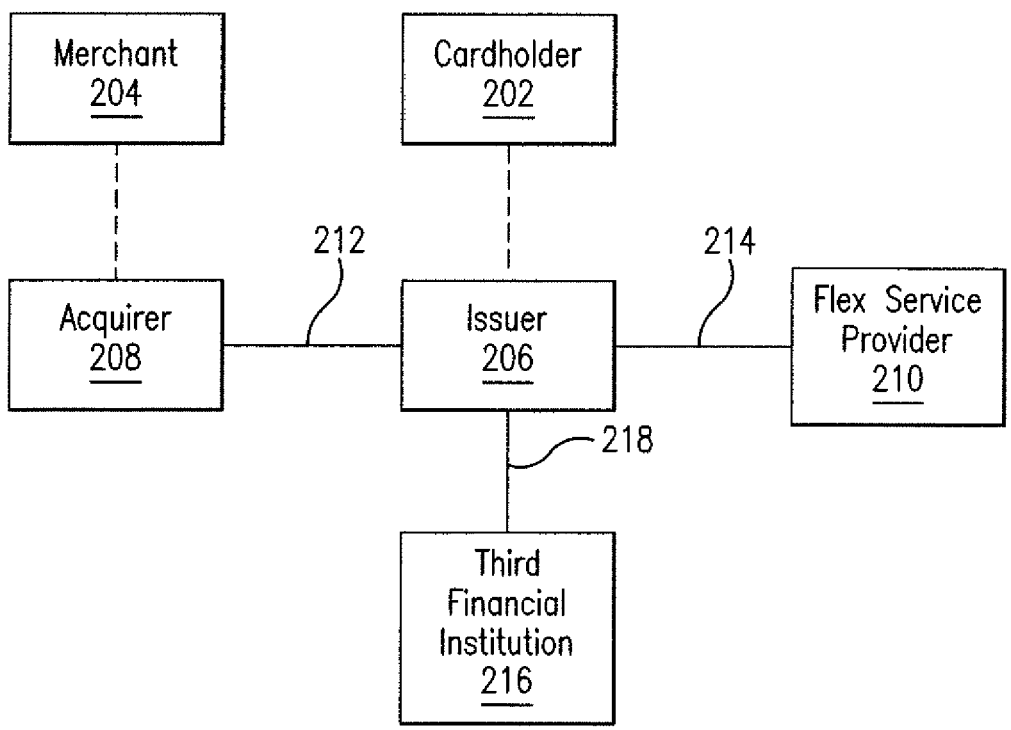
FIG. 2 shows a second embodiment of the system of the disclosed subject matter.

FIG. 2 shows an alternate embodiment of a system involving a third party flex service provider 210. Issuer 206 and acquirer 208 are connected through communication link 212. Flex service provider is connected to issuer 206 through communication link 214.

Figure 3:
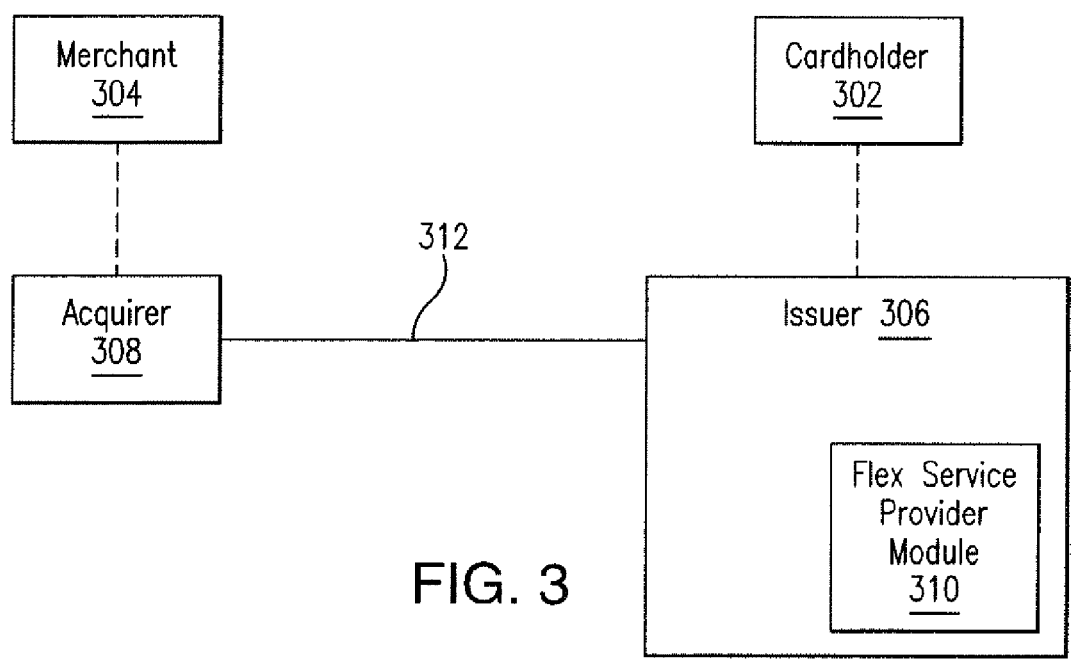
FIG. 3 shows a third embodiment of the system of the disclosed subject matter.

In another embodiment, shown in FIG. 3, the issuer may perform the service provider functions. Issuer 306 may include an internal flex service provider module 310.

In some embodiments, the issuer is also communicably connected to a third financial institution 116 through communication link 118. Communication link 118 may include an automated clearing house ("ACH") which connects the issuer 106 to other financial institutions.

Figure 4:
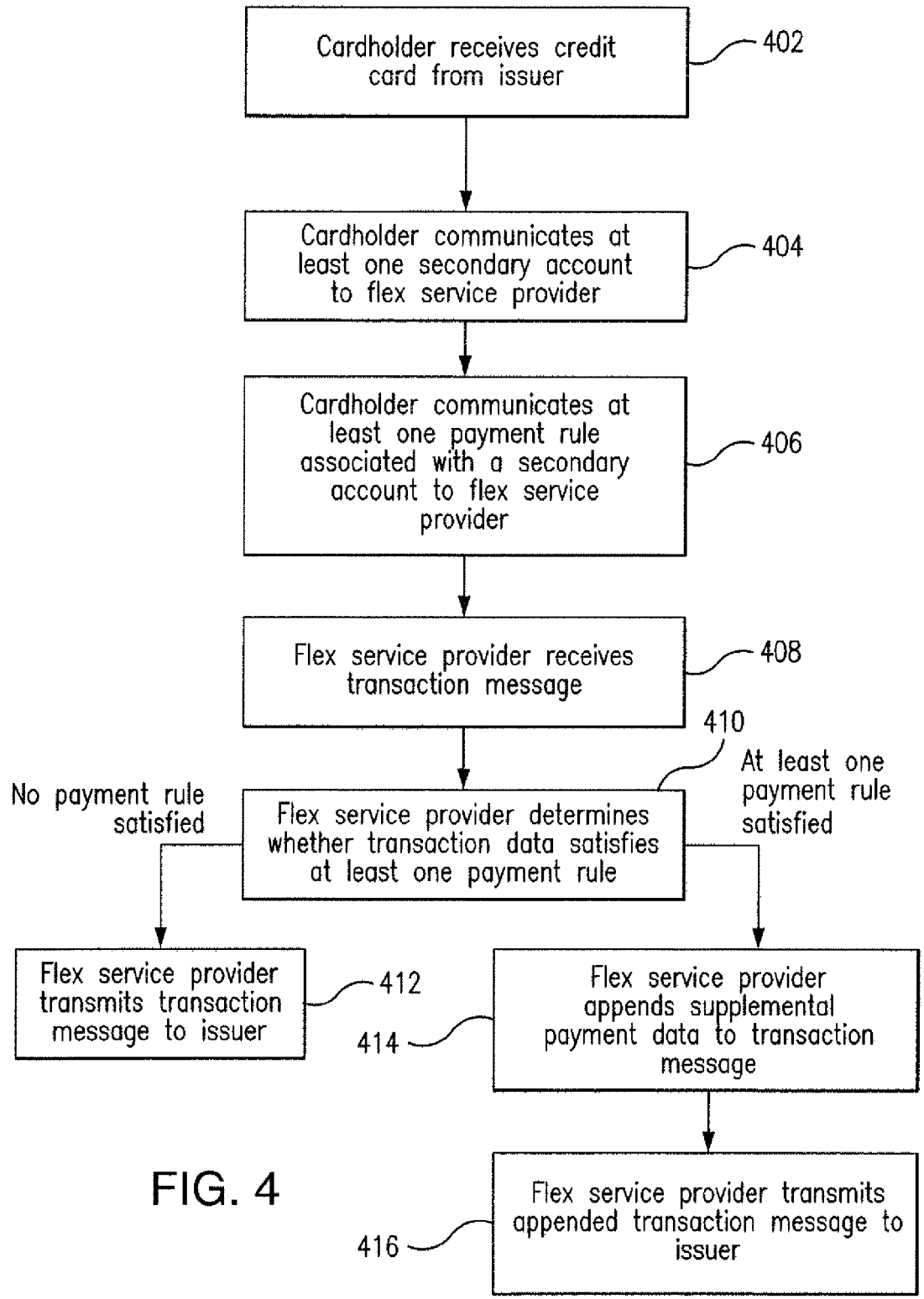
FIG. 4 shows the transaction flow of one embodiment of the disclosed method wherein the flex service provider appends supplemental payment data to a transaction message.

FIG. 4 describes an embodiment of the transaction flow using the setup described in FIG. 1. The cardholder 102 signs up for a credit card account at step 402 with the issuer 108. The credit card account is associated with a credit card account number that identifies a credit card account ("the primary credit card account"). The primary credit card account is associated with a revolving line of credit which is provided to the cardholder by the issuer 106. The credit card account number may be a primary account number (PAN) which is listed on the face of the issued credit card or other payment token.

Although the term "credit card" includes traditional plastic card-shaped tokens used to perform credit transactions at a point of sale, as used herein, the term "credit card" is not limited to these traditional tokens, and should be understood to mean any physical token associated with a credit card account used to perform a transaction, including RF payment devices, magstripe cards, key fobs, and smart cards, whether or not such devices are card-shaped.

The issuer 108 offers a flex service program with at least some of the credit cards it offers to prospective cardholders. The cardholder 102 may be required to register for the flex service program and pay a fee, or the program may be offered to every cardholder without additional fees. The issuer 108 may contract with a third party flex service provider 110 to administer the flex service program, or the issuer 108 may administer the program itself.

The cardholder 102 then communicates certain information described below to the flex service provider 110. The cardholder 102 may use a customer interface made available to card holders. In one embodiment, the cardholder 102 communicates this information to the flex service provider 110 via a website hosted at a URL provided buy the flex service provider 110 to the issuer 106, which is given to the cardholder 102 when the credit card is issued. In other embodiments, the cardholder 102 provides the information to the issuer 106 (such as upon enrolling in the flex service program), and the issuer 106 transmits the information to the flex service provider 110. In general, the cardholder 102 may communicate with the flex service provider 110 in any way known in the art including, for example, via telephone, in person, or through any user interface, including mobile devices such as PDAs or smartphones.

By providing the information discussed above, the cardholder 102 identifies at least one secondary account, which the flex service provider 110 associates with the primary credit card account at 404. The flex service provider may use a processor to associate the primary credit card account with the at least one secondary account. The secondary account number may be a credit card account other than the primary credit card account, a checking account, a savings account, a money market account, a home equity line of credit, an installment loan account, a personal line of credit, or any other financial account. The cardholder 102 may optionally identify two or more secondary accounts to be associated with the primary credit card account. In one embodiment, the secondary account or accounts are maintained at the issuer 106, i.e., at the same financial institution as the primary credit card account. In another embodiment, at least one of the secondary accounts is maintained at a different financial institution than the institution maintaining the primary credit card account. For example, one of the secondary accounts may be maintained at the third financial institution 116.

The flex service provider may authenticate the accounts provided by the cardholder. For example, the flex service provider may internally authenticate a credit card account identified by the cardholder (e.g., based on the PAN) using other information provided by the cardholder (e.g., the cardholder's name or address). The flex service provider may also transmit an account authentication message to the issuer to authenticate that primary credit card account (e.g., the PAN) and the secondary account (e.g., a Demand Deposit Account ("DDA")) are associated with the same cardholder. The issuer may confirm this information by checking its customer records. In another embodiment, the issuer may confirm the accounts are commonly owned by performing a microdeposit. The issuer may, for example, send a microdeposit if the secondary account is maintained at a different financial institution. The cardholder may then be required to verify the amounts sent to the bank account to confirm common ownership. When the accounts are authenticated, an email or other communication may be sent to the cardholder to confirm that the flex service account has been activated.

The cardholder also identifies one or more payments rules which indicate the type of transactions to be funded by the secondary account, which the flex service provider defines at 406. The flex service provider may define the payment rules by associating the payment rules with the secondary account in a database stored in a memory unit of the flex service provider's computer system. A table showing examples of payment rules for a particular account is shown in FIG. 5. Each entry in the table identifies the name of the payment rule in column 502, the criteria for each payment rule in column 504, the secondary account in column 506, and the priority in column 508. For purposes of this table, Account A is a checking account maintained at the issuer 106, Account B is a savings account maintained at the issuer 106, and Account C is a checking account maintained at the third financial institution 116.

The payment rules may be based on transaction criteria. Transaction criteria is any information pertaining to the transaction, including a transaction type (e.g., cash withdrawal, POS purchase, e-commerce or Internet, PayPass, etc.), a transaction amount for the transaction, POS geography (e.g., outside the United States), a merchant type (such as a SIC code or MCC code), a merchant identity, a date of the transaction (e.g., day of the week), or any other information pertaining to the transaction. For example, payment rule 510 in FIG. 5 indicates that all transactions with a transaction amount over $250 should be funded using Account A. Payment rule 512 indicates that all transactions with a merchant type indicating that the merchant is a grocery store should be funded using Account B.

The payment rules may also be based on criteria not related to the transaction, such as accumulated spending over a predetermined time period or a current credit line balance. For example, payment rule 514 in FIG. 5 indicates that when the remaining balance of the credit line associated with the credit card account is less than $500, the transaction should be funded using Account B.

A payment rule may require that multiple criteria to be met. For example, payment rule 516 in FIG. 5 requires that the transaction amount is over $100 and that the merchant type indicates that the merchant is a pharmacy. If the transaction satisfies both of these criteria, the transaction is funded using Account C. The payment rule may include any number of criteria. For example, payment rule 518 includes three criteria.

In some cases, two or more payment rules may be satisfied for the same transaction. For example, cardholder 102 may use the credit card associated with the payment rules in FIG. 5 to purchase over $300 of goods from a pharmacy. Payment rule 510 is satisfied and indicates that the transaction should be funded using Account A. However, payment rule 516 is also satisfied, and indicates that the transaction should be funded using Account C. Therefore, in some embodiments of the disclosed subject matter, the cardholder 102 may set priority rules for the payment rules. In FIG. 5, the cardholder has indicated that payment rule 510 has priority over payment rule 516, as reflected by the priority indicator stored in column 508, such that the transaction described above would be funded using Account A.

The cardholder may wish to fund all transactions conducted using a credit card with a secondary account. In one embodiment, this may be accomplished using a data field indicating that all purchases should be funded with the secondary account. In other embodiments, a payment rule is defined such that any transactions having a transaction amount of over $0, or any transactions where the cardholder's remaining balance on the credit line is greater than $0, should be funded by the secondary account. If the cardholder indicates that all transactions except those meeting payment rules 510-520 in FIG. 5 should be funded using a secondary account (e.g., secondary account D), this payment rule may be given a priority of 7.

The cardholder may also be able to provide names for each of the payment rules. For example, payment rule 510 in FIG. 5 has been named "OVER250."

The cardholder 102 may further be asked to provide additional information to the flex service provider 110. For example, the cardholder 102 may be required to provide information identifying the primary credit card account, such as the credit card account number or the PAN. In environments where a single budgeting entity has multiple credit cards (such as a corporate account, or in a household with multiple credit card holders), the information provided to the flex service provider may also include the multiple card account numbers to be associated with the secondary accounts and payment rules. This may entail enrolling each credit card in a flex card program operated by a single flex service provider.

After the cardholder 102 has communicated the payment rules and secondary account information to the flex service provider 110, the cardholder 102 uses the credit card to purchase goods or services from a merchant 104. In a credit card transaction, the merchant 104 or the acquirer 108 generally sends a transaction message to a payment network for routing to the issuer 106. The transaction message may be an authorization message used to request approval for the transaction. Such request may include authentication of the card (such as through authentication data generated by and/or stored on the card, such as a card verification code ("CVC") from a magstripe on the card, or a dynamic CVC generated by a processor embedded in the payment card) and/or confirmation that the cardholder 102 has a sufficient amount of available credit in the primary credit card account to fund the transaction. The authorization message also includes transaction information such as, for example, a credit card number, a transaction amount, or other data pertaining to the transaction. In other embodiments, the transaction message may be a clearing message sent in lieu of or in addition to the authorization message.

The transaction message may be received by the flex service provider 110 at 408. Generally, the transaction message is received by a processor operated by the flex service provider 110. In one embodiment, the transaction message is received by a receiver at a managing platform operated by the flex service provider 110. In some embodiments, all transaction messages are passed to the flex service provider 110. In other embodiments, the transaction message is passed to the flex service provider 110 based on transaction information. In one embodiment, for example, all cards in a particular number range (e.g., based on a Bank Identification Number ("BIN") or BIN range) are presumed to be enrolled in the flex payment program and therefore all transaction messages including a credit card number (e.g., a PAN) in that particular range are passed to the flex service provider 110.

The transaction message may be sent to the flex service provider 110 before being sent to the issuer 106, as shown in FIG. 1. Although not shown, it is understood that the message may be sent by acquirer 108 to a payment network for routing to a flex service provider 110, or the payment network may function as the flex service provider. The transaction message may also be sent to the flex service provider 110 after being received by the issuer 106. The issuer 108 may determine whether the credit card used for the transaction was enrolled in the flex payment program using the same criteria described above. If it is determined that the credit card is enrolled in the program, the transaction message may be sent to the flex service provider 110 for processing. This method of processing the transaction may be implemented using the system disclosed in FIG. 2.

In a further embodiment, which may be implemented using the setup shown in FIG. 3, the flex service provider is the issuer 306. In this embodiment, the transaction message is received by the issuer 306 and subsequently sent to a flex service system or module 310 operated by the issuer 306.

The flex service provider 110 uses a determination unit to determine whether the transaction data satisfies at least one of the one or more payment rules at 410. The determination unit may be a processor programmed with logic to determine whether transaction data satisfies at least one of the one or more payment rules. The determination unit may be communicably connected to a database of payment rules associated with one or more credit card accounts. The flex service provider may determine whether the transaction data satisfies at least one of the one or more payment rules based on the information in the transaction message. If the transaction data does not satisfy any of the payment rules, the transaction message may be transmitted to the issuer 108 for further processing at 412. The issuer 106 processes the transaction message as a regular credit card transaction and transmits either an approval or a denial message to the acquirer 108 and/or the merchant 104.

However, if the flex service provider 110 determines that the transaction data contained in the transaction message satisfies at least one of the payment rules, the flex service provider 110 appends supplemental payment data to the authorization message at 414. The format of the supplemental payment data may be determined by the issuer 106. For example, when establishing the flex payment program, the issuer 106 may provide instructions to the flex service provider 110 regarding the format of the supplemental payment data to be conveyed within the transaction message. These instructions may include a bitmap or other formatting information describing the identity and placement of the data within the authorization message. The format specified by the issuer 106 may include the account number of the secondary account or some other secondary account identifier. The format may also include the type of secondary account. In some embodiments, each of the payment rules is given a name or other identifier by the cardholder and/or service provider. The name or other identifier may also be included as part of the supplemental payment data added to the transaction message.

For example, referring again to FIG. 5, a cardholder 102 uses the credit card to purchase goods or services for an amount greater than $250. Therefore, the transaction satisfies payment rule 510. The supplemental payment data can include one or more of the account number of Account A, information indicating that the selected secondary account is a checking account, and the name of the payment rule (OVER250). The account type of the selected secondary account may be represented by numbers. For example, the transaction message may include information indicating that the selected account is a type 1 account, where 1=Checking, 2=Savings, 3=Money Market Account, 4=Home Equity Line of Credit, etc.

As noted previously, in some cases the secondary account is maintained at a different financial institution than the credit card line of credit. For example, the transaction may satisfy only payment rule 518 in FIG. 5, in which case Account C is selected as the secondary account. Account C is maintained at the third financial institution 116. The identity of the third financial institution 116 may be included in the supplemental payment data appended to the transaction message. The identity of the third financial institution may be communicated using a routing number or an account number which identifies the third financial institution 116.

In another example, a cardholder 102 may use the credit card to purchase goods and services in amount of $5 at gas station GS. For purposes of this example, the remaining balance on the credit card is $750 and the cardholder has charged only $40 to the credit line over the past week. Therefore, the transaction does not satisfy any of payment rules 510-518. Payment rule 520, LESS10, is satisfied, and the transaction is therefore funded using Account C. The supplemental payment data may include one or more of the account number of Account C, the identity of the third financial institution, a routing number, information indicating that the selected secondary account is a checking account, and the name of the payment rule (LESS10).

After the supplemental payment data is appended to the transaction message, the appended authorization message is transmitted to the second financial institution for further processing at 416 using a transmitter.

Figure 6:
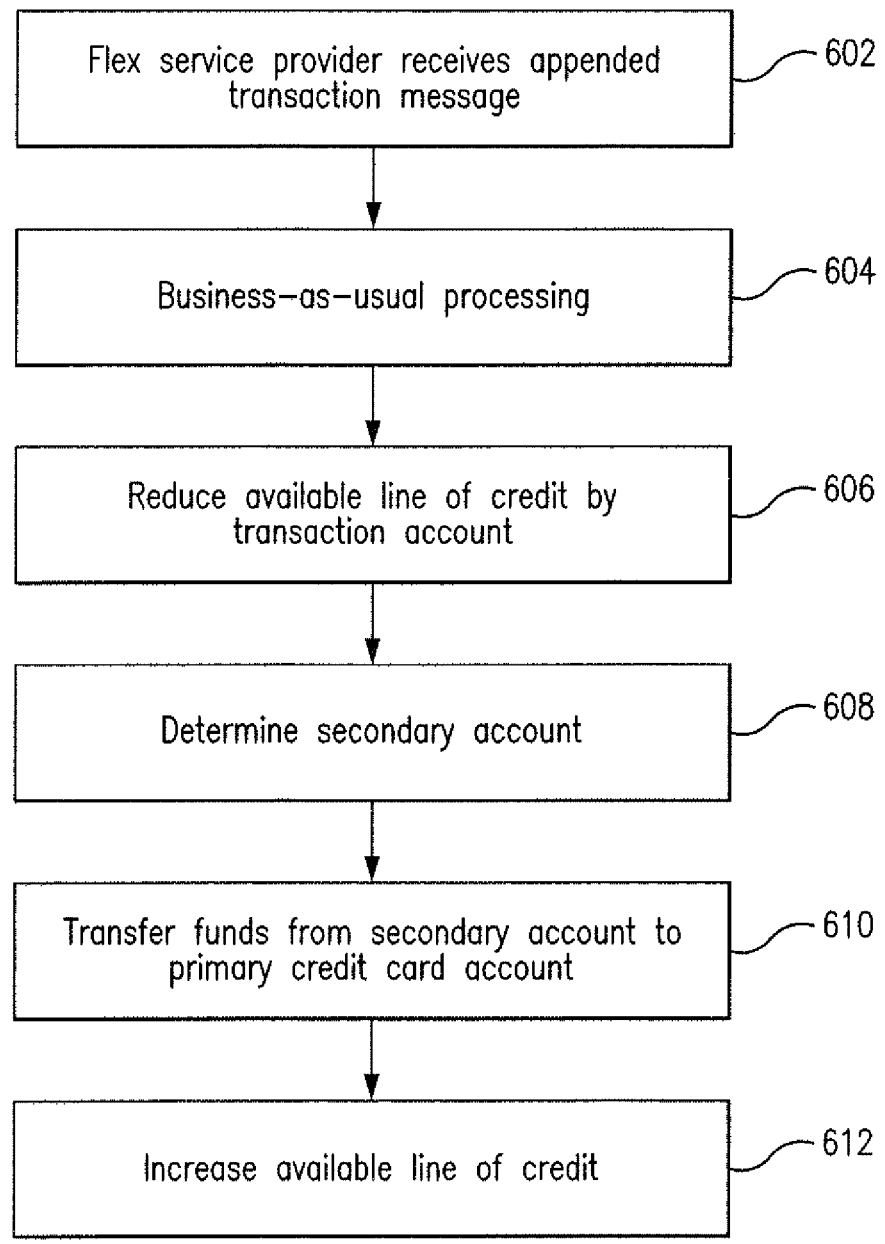
FIG. 6 shows the transaction flow of one embodiment of the disclosed method wherein the appended transaction message is received by a financial institution.

FIG. 6 describes one embodiment of the transaction flow after the appended authorization message reaches the issuer 106. The issuer 106 receives the appended transaction message at 602. The issuer 106 then performs business-as-usual processing on the transaction message at 604. In one embodiment, the transaction message is an authorization message and the business-as-usual processing includes determining whether the available line of credit is larger than the transaction amount and sending an indication of whether the transaction is approved or denied to the merchant 104 and/or the acquirer 108.

The issuer 106 may then reduce the available line of credit by the transaction amount at 606. In some embodiments, the available line of credit is immediately reduced by the transaction amount. In other embodiments, the available line of credit is reduced at a later time. For example, where the transaction message is an authorization message, the issuer 106 may reduce the available line of credit only on receipt of a clearing message for the transaction.

The issuer 106 determines whether a secondary account has been identified at 608. This determination may be made using the supplemental payment data appended to the transaction message alone. In other embodiments, the determination is made using the payment data and information stored at an internal database. For example, the issuer 106 may use the credit card number in the transaction message to identify the customer, and then use the supplemental payment data together with its own internal database to determine the proper secondary account type and account number associated with the cardholder. The issuer 106 may also determines the secondary account number. The issuer 106 may further determine additional information, such as the secondary account type, the financial institution associated with the secondary account, or the name of the cardholder.

Using this information, the issuer 106 transfers money from the secondary account to the primary credit card account at 610. If the secondary account is maintained at the same financial institution as the primary credit card account (i.e., at the issuer 106), the issuer 106 may accomplish the transfer by debiting the secondary account by the transaction amount and increasing the available credit in the primary credit card account using its own internal financial accounting systems.

In other embodiments, the secondary account is maintained at a different financial institution than the primary credit card account (e.g., the secondary account may be maintained at the third financial institution 116). In these embodiments, the issuer 106 sends instructions to the third financial institution 116 to transfer funds in the amount of the transaction amount to the issuer 106. The transfer may be accomplished through an automated clearing house or other banking network. The issuer 106 receives the transferred funds from the third financial institution 116 and increases the available credit in the primary credit card account by an amount equal to the transaction amount. However, if the attempted transfer is unsuccessful, the transaction remains on the line of credit associated with the credit card account.

Figure 7:
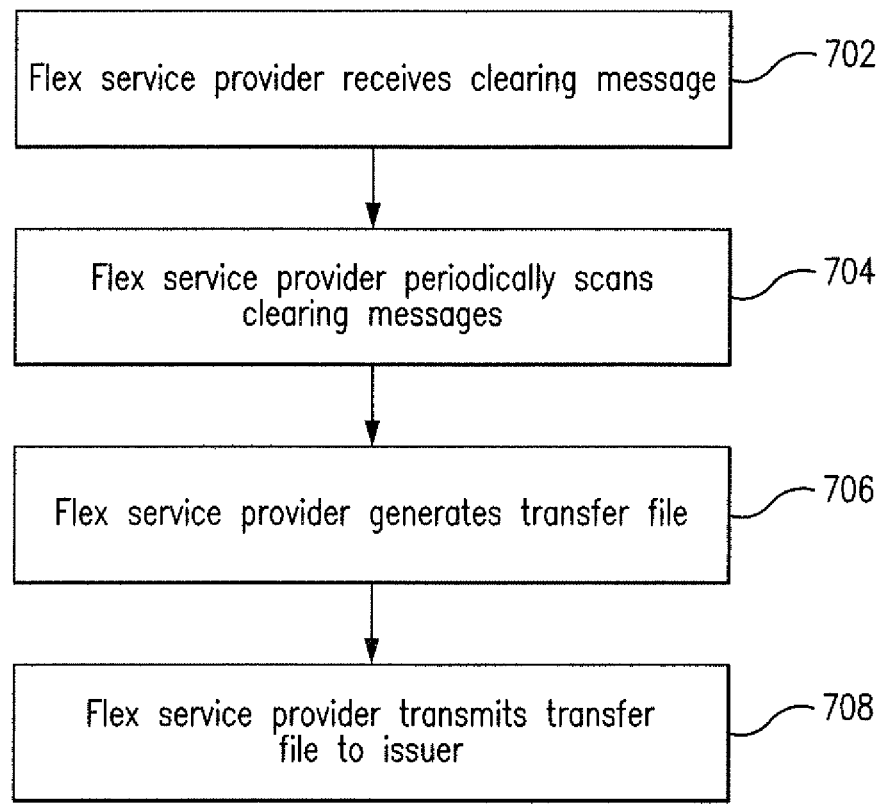
FIG. 7 shows the transaction flow of one embodiment of the disclosed method wherein the flex service provider generates a transfer file based on clearing messages.

In other embodiments, the transactions are each processed as regular credit card transactions. An exemplary embodiment of this process is described with reference to FIG. 7. The flex service provider 110 receives a clearing message at 702. In some embodiments, the flex service provider 110 stores the information and forwards the clearing message to the issuer 106. Periodically, the flex service provider 110 may scan the clearing messages to determine which transactions should be funded using secondary accounts at 704. For example, the flex service provider 110 may scan the clearing messages to identify clearing messages that include clearing supplemental payment data. Clearing supplemental payment data may be the supplemental payment data appended to the transaction message. However, in some embodiments, clearing supplemental payment data is different that the supplemental payment data appended to the transaction message. The scanning process may occur once a day, multiple times a day, multiple times per week, or at any other interval. Alternatively, the flex service provider 110 may scan the clearing messages at other times, such as after a certain number of clearing messages have been received or upon demand.

In some embodiments, the cardholder may specify payment dates through the user interface. In this manner, the transactions are funded based on a schedule determined by the cardholder. The cardholder may specify periodic payment dates (e.g., every 5 days or every 14 days). Alternatively, the cardholder may specify specific dates (e.g., the first of every month or the first Monday of every month). The user interface may also give the cardholder the option of not selecting a payment date, such that the transactions are funded using the secondary account based on a standard schedule determined by the issuer. In another embodiment, the cardholder is not given such an option, and the transactions are processed on a schedule determined by the issuer. For example, the issuer may specify that the transfer occur immediately, or may specify that the payment date is a period of time (e.g., 21 days) after the transaction.

Once the flex service provider 110 determines which clearing messages are related to transactions that should be funded using a secondary account, the flex service provider 110 generates a transfer file at 706. The transfer file may contain information identifying each of the transfers from secondary accounts to credit card accounts that should be performed. This file is generated by aggregating one or more of the transactions identified during the scanning process. As such, the file is generated by identifying transactions performed by cardholders which satisfy the cardholder's pre-stored payment rules. The transfer file is specific to a financial institution, such that each record in the transfer file pertains to a transaction using a credit card issued by a common financial institution, for example, issuer 108.

In some embodiments, the transfer file identifies each transaction individually, such that a single transfer file may specify three transfers from a cardholder's secondary account to the cardholder's credit card account. In another embodiment, the transfers are batched such that the transfer file specifies only a single transfer from a cardholder's secondary account to the cardholder's credit card account. In such embodiment, the transfer amount will reflect the aggregated total for all transactions funded by the cardholder's secondary account.

In one embodiment, the transfer file is created in a custom format. For example, for financial institutions A, B, and C, three transfer files with three different formats may be generated by the flex service provider 110. The custom format may be specified by the issuer. The transfer file is then transmitted to the second financial institution at 708.

In another embodiment, the flex service provider 110 performs a periodic sweep of settlement data to identify flex payment transactions as described above. The flex service provider 110 then generates one or more electronic payment messages in accordance with a Remote Payment and Presentment Services format such as MasterCard's RPPS format and transmits them to the issuer 106 to initiate the secondary payment process.

The credit card or credit account statement received by the cardholder 102 may include different sections corresponding to the use of secondary accounts. For instance, the statement may have a separate section for transactions funded by secondary accounts. Such transactions may be identified with a particular character or in some other fashion on the statement. Where multiple secondary accounts are used to fund various transactions, the statement may have multiple sections, each corresponding to transactions funded using the secondary account associated with that section. For example, using the payment rules specified in FIG. 5, the credit card statement could have four sections: one for transactions pending with the primary credit card account (i.e., not funded by any secondary account), and one each for the transactions funded by Account A, Account B, and Account C. In another embodiment, the credit card statement may include separate sections for each payment rule identified by the payment rule names. Using the payment rules specified in FIG. 5, such a statement may include 7 sections: one for the primary credit card account, and one each for OVER250, GROCERY, NEARBALANCE, OVER100ANDPHARMACY, LESS50STOREA2WEEKS, and LESS10. In another embodiment, the statement may include a pending payment section for transactions that will be funded by a secondary account but have not been processed by the statement date.

Figure 8:
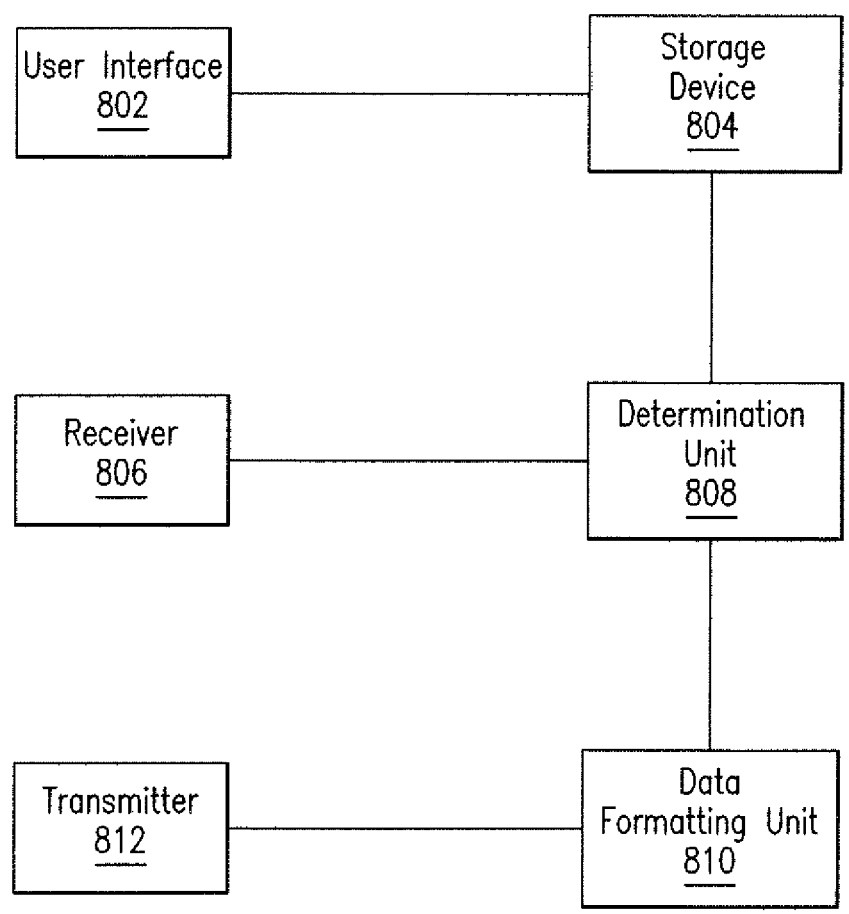
FIG. 8 shows an exemplary embodiment of the flex service provider system of the disclosed subject matter.

FIG. 8 illustrates an exemplary embodiment of the system used by the flex service provider in connection with the disclosed subject matter. The system includes a user interface 802, a storage device 804, a receiver 806, a determination unit 808, a data formatting unit 810, and a transmitter 812.

The user interface 802 is designed to receive a secondary account identifier and at least one payment rule associated with the secondary account from the cardholder. This information may be input directly by the cardholder or account holder. In another embodiment, the secondary account identifier and the at least one payment rule is input by any third party on behalf of the cardholder. For example, the at least one payment rule may be input by an employee of the issuing financial institution or by an automated agent on behalf of the cardholder. In another embodiment, the user interface may also include a customer service interface that allows customer service representatives of the issuing financial institution to access profiles associated with the issuing financial institution. The customer service representatives may view and edit customer profiles, PANs, DDAs, payment rules, and secondary account information. In some embodiments, the customer service representative may also be able to create new profiles (i.e., enroll cardholders in the flex service program) using the customer service interface.

The user interface 802 may be a computer terminal operated by the flex service provider. In other embodiments, the cardholder accesses the user interface 802 through a personal computer using a web browser to access a website hosted by the issuer, the flex service provider, or a third party. The cardholder may also be able to access the user interface 802 through a wide range of devices, including mobile devices such as cellular telephones, PDAs, or smartphones. For example, the cardholder may access the user interface through a mobile application running on a smartphone.

The user interface 802 is communicably connected to a memory unit/storage device 804 for storing data. The storage device 804 stores information about the credit card account of each cardholder enrolled in the flex service program. The information stored by the storage device 804 includes information about at least one secondary account associated with each primary credit card account. The stored information also includes the payment rules associated with each secondary account. The storage device may be any device having memory. For example, the storage device 804 may be a personal computer or the hard drive of a personal computer. In another embodiment, the storage device 804 is an external hard drive. In yet another embodiment, the storage device 804 is a remote server. The data may be stored in a traditional flat file or other database format within the storage device.

The flex service provider system also includes a receiver 806 for receiving a transaction message associated with a credit card transaction from a second financial institution. The transaction message is conveyed over a communication link, such as the Internet, a virtual private network, and/or a payment network.

The receiver 806 is communicably connected to a determination unit 808. The determination unit 806 is a processor programmed with logic to determine whether the transaction data satisfies at least one of the one or more payment rules. The determination unit 808 is also communicably connected to the storage device 804. In one embodiment, the determination unit 808 receives the transaction message, identifies the credit card account associated with the transaction message, retrieves the payment rules associated with the credit card account, and determines whether the transaction data in the transaction message satisfies at least one of the payment rules. However, the determination unit does not have to perform each of these steps. For example, in an alternative embodiment, the determination unit 808 receives one or more data files including the payment rules and the transaction data and determines whether the transaction data satisfies at least one of the payment rules.

The determination unit 808 is communicably connected to a data formatting unit 810 for appending supplemental payment data to the transaction message. The data formatting unit can be a digital processor programmed with logic to carry out the functionality discussed herein. In an alternative embodiment, however, a single processor can be used to perform the functionality of the determination unit 808 and the data formatting unit 810. For example, the same processor may be configured to determine whether the transaction data satisfies one or more of the payment rules and to append the supplemental payment data to the transaction message.

The data formatting unit 810 is communicably connected to a transmitter 812. The transmitter 812 may be combined with the receiver 806 to form a transmitter-receiver or a transceiver. However, in other embodiments the transmitter 812 is separate from the receiver 806. The transmitter 812 is connected to a data network to transmit the appended transaction message to the first financial institution.

Figure 9:
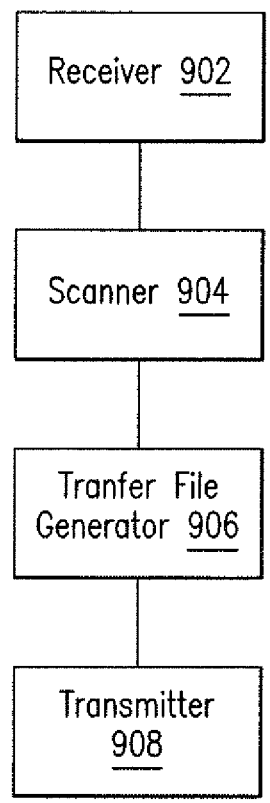
FIG. 9 shows an exemplary embodiment of the flex service provider clearance system of the disclosed subject matter.

FIG. 9 illustrates an exemplary embodiment of the clearance system used by the flex service provider in connection with the disclosed subject matter. The clearance system includes receiver 902, scanner 904, transfer file generator 906, and transmitter 908. Receiver 902 and transmitter 908 will generally, but not necessarily, be the same as receiver 806 and transmitter 812 in FIG. 8.

Scanner 904 is communicably connected to receiver 902. Scanner 904 receives clearing messages from the receiver 902 and scans these clearing messages to identify at least one clearing message including supplemental payment data. In some embodiments, scanner 904 continuously scans the clearing messages as they are received. However, in other embodiments, scanner 904 scans the clearing messages only periodically. For example, scanner 904 may scan the clearing messages collected from the receiver every hour, day, two days, or at any other interval specified by the flex service provider.

Scanner 904 is communicably connected to transfer file generator 906. When scanner 904 identifies a clearing message as including supplemental payment data, a transfer file is generated for that clearing message by the transfer file generator 906. The transfer file includes information to effect a transfer from a secondary account associated with the clearing message to a credit card account associated with the clearing message. The transfer file is then transmitted to the first financial institution for initiation of a secondary payment process by transmitter 908, which is communicably connected to the transfer file generator 906.

While the disclosed subject matter has generally been described in relation to a single line of credit associated with a credit card, those skilled in the art will understand that the subject matter may also be applied to two or more credit card accounts associated with one or more credit cards. For example, the secondary account(s) and payment rule(s) identified by the cardholder may be associated with a first primary credit card account and a second primary credit card account, such that the flex service provider processes any transactions made using these credit card accounts as described herein. In some embodiments, only a single secondary account is used to fund transactions conducted using the first and second primary credit card accounts. Alternatively, different secondary account(s) and/or payment rule(s) may be associated with each primary credit card account. For example, the first and second primary credit card accounts may both be associated with secondary account A, but different payment rules may be associated with each of the primary credit card accounts. In another embodiment, the first and second credit card accounts may both be associated with secondary accounts A, B, and C. In this embodiment, the same or different payment rules may be used to determine whether secondary accounts A, B, or C should fund a given transaction.

In addition, while the disclosed subject matter has been described with reference to credit cards, it will be understood that other payment cards may also be used, including debit cards, pre-paid cards, and commercial cards. For example, a cardholder's debit account may be associated with a payment rule and a secondary account, such that all transactions conducted using the debit account are funded using the cardholder's debit account unless the payment rule is satisfied, in which case the transaction is funded using the secondary account as described herein. As described above with reference to credit cards, multiple payment rules and secondary accounts may be associated with one or more payment card accounts.

The foregoing merely illustrates the principles of the invention. It will thus be appreciated that those skilled in the art will be able to devise numerous systems and methods which, although not explicitly shown or described herein, embody the principles of the invention and thus within the spirit and scope of the invention.

We claim:

1. A method for using supplemental payment data to indicate that a secondary account funds a credit card transaction conducted between a cardholder and a merchant, the method comprising:
    associating a secondary account with a credit card account, said credit card account maintained at a first financial institution;
    defining one or more payment rules associated with said secondary account;
    receiving, from a second financial institution, a transaction message associated with a credit card transaction using said credit card account, said transaction message comprising transaction data;
    determining whether said transaction data satisfies at least one of said one or more payment rules;
    appending, after said receiving, using a processor, supplemental payment data to said transaction message to form an appended transaction message when said transaction data satisfies at least one of said one or more payment rules, said supplemental payment data indicating that said credit card transaction is to be funded using said secondary account; and
    transmitting said appended transaction message to said first financial institution to be processed against the credit card account,
    wherein funds are transferred from the secondary payment account to the credit card account based on the supplemental payment data.

2. The method of claim 1, wherein said transaction message comprises one of an authorization message and a clearing message.

3. The method of claim 1, wherein at least one of said one or more payment rules is based on at least one of a transaction amount, a merchant code, a merchant identity, a date of transaction, a total spending amount over a pre-determined time period, or a credit line balance.

4. The method of claim 1, wherein said one or more payment rules are further associated with a supplemental payment data format associated with said first financial institution, and said supplemental payment data is appended in said format.

5. The method of claim 1, wherein said supplemental payment data includes a secondary account identifier.

6. The method of claim 1, wherein said supplemental payment data includes a secondary account type identifier.

7. The method of claim 1, wherein said supplemental payment data includes at least one of a routing number or an account number.

8. The method of claim 1, wherein said supplemental payment data includes a name associated with a satisfied payment rule.

9. The method of claim 1, further comprising:
    periodically scanning clearing messages to identify at least one clearing message that includes said supplemental payment data;
    generating a transfer file, said transfer file including information to effect a transfer from a secondary account associated with said at least one clearing message to a credit card account associated with said at least one clearing message; and
    transmitting said transfer file to said first financial institution for initiation of a secondary payment process.

10. The method of claim 9, wherein said transfer file is generated in a custom format specified by the first financial institution.

11. The method of claim 9, wherein said transfer file is generated in a RPPS format.

12. The method of claim 1, further comprising:
    receiving said appended transaction message; and
    reducing an available line of credit associated with the credit card account based on the transaction data.

13. The method of claim 1, wherein the secondary payment account is maintained at a different financial institution than the credit card account.

14. A system for using supplemental payment data to indicate that a secondary account funds credit card transaction conducted between a cardholder and a merchant, the system comprising:
    a user interface for receiving a secondary account identifier and at least one payment rule associated with the secondary account from the cardholder;
    a storage device for storing data associating the secondary account with a credit card account associated with the cardholder and defining one or more payment rules associated with the secondary account, said credit card account maintained at a first financial institution;
    a receiver for receiving a transaction message associated with a credit card transaction, said transaction message comprising transaction data;
    a determination unit for determining whether the transaction data satisfies at least one of the one of more payment rules; and
    a data formatting unit for appending supplemental payment data to the transaction message to form the appended transaction message where the transaction data satisfies at least one of the one or more payment rules, the supplemental payment data indicating that the credit card transaction is to be funded using the secondary account; and
    a transmitter for transmitting an appended transaction message to the first financial institution to be processed against the credit card account,
    wherein funds are transferred from the secondary payment account to the credit card account based on the supplemental payment data.

15. The system of claim 14, wherein said transaction message comprises one of an authorization message and a clearing message.

16. The system of claim 14, wherein at least one of said one or more payment rules is based on at least one of a transaction amount, a merchant code, a merchant identity, a date of transaction, a total spending amount over a pre-determined time period, or a credit line balance.

17. The system of claim 14, wherein said one or more payment rules are further associated with a supplemental payment data format associated with said first financial institution, and said supplemental payment data is appended in said format.

18. The system of claim 14, wherein said supplemental payment data includes the secondary account identifier.

19. The system of claim 14, wherein said supplemental payment data includes a secondary account type identifier.

20. The system of claim 14, wherein said supplemental payment data includes at least one of a routing number or an account number.

21. The system of claim 14, wherein said supplemental payment data includes a name associated with a satisfied payment rule.

22. The system of claim 14, further comprising:
a scanner for periodically scanning clearing messages to identify at least one clearing message that includes said supplemental payment data;
a transfer file generator for generating a transfer file, said transfer file including information to effect a transfer from a secondary account associated with said at least one clearing message to a credit card account associated with said at least one clearing message; and
wherein the transmitter is further configured to transmit said transfer file to said first financial institution for initiation of a secondary payment process.

23. The system of claim 22, wherein said transfer file is generated in a custom format specified by the issuer.

24. The system of claim 22, wherein said transfer file is generated in a RPPS format.

* * * * *